United States Patent
Iwai et al.

(10) Patent No.: US 12,157,095 B2
(45) Date of Patent: Dec. 3, 2024

(54) BASE MATERIAL FOR LIQUID FILTERS

(71) Applicant: TEIJIN LIMITED, Osaka (JP)

(72) Inventors: Ayumi Iwai, Osaka (JP); Koji Furuya, Osaka (JP); Yu Nagao, Osaka (JP); Yoshikazu Ikuta, Osaka (JP)

(73) Assignee: TEIJIN LIMITED, Osaka (JP)

( * ) Notice: Subject to any disclaimer, the term of this patent is extended or adjusted under 35 U.S.C. 154(b) by 830 days.

(21) Appl. No.: 17/262,008

(22) PCT Filed: Jul. 23, 2019

(86) PCT No.: PCT/JP2019/028817
§ 371 (c)(1),
(2) Date: Jan. 21, 2021

(87) PCT Pub. No.: WO2020/022321
PCT Pub. Date: Jan. 30, 2020

(65) Prior Publication Data
US 2021/0308633 A1  Oct. 7, 2021

(30) Foreign Application Priority Data
Jul. 25, 2018  (JP) ................................. 2018-139729

(51) Int. Cl.
*B01D 71/26* (2006.01)
*B01D 69/02* (2006.01)

(52) U.S. Cl.
CPC ........... *B01D 71/261* (2022.08); *B01D 69/02* (2013.01); *B01D 71/262* (2022.08); *B01D 2325/028* (2013.01); *B01D 2325/20* (2013.01); *B01D 2325/24* (2013.01); *B01D 2325/341* (2022.08)

(58) Field of Classification Search
CPC ............... B01D 71/26; B01D 69/02; B01D 2325/028; B01D 2325/34; B01D 2325/20; B01D 2325/24; B01D 2325/341; B01D 67/002; B01D 71/261; B01D 71/262
See application file for complete search history.

(56) References Cited

U.S. PATENT DOCUMENTS

| | | | |
|---|---|---|---|
| 6,648,945 B1 | 11/2003 | Takeda et al. | |
| 2004/0135274 A1* | 7/2004 | Matsuda | B01D 67/0086 264/28 |
| 2011/0311878 A1 | 12/2011 | Inagaki et al. | |
| 2014/0048476 A1* | 2/2014 | Ge | B01D 71/36 210/489 |
| 2016/0096152 A1 | 4/2016 | Ohno et al. | |
| 2017/0266865 A1 | 9/2017 | Zhang et al. | |
| 2018/0280894 A1 | 10/2018 | Iwai et al. | |

FOREIGN PATENT DOCUMENTS

| | | |
|---|---|---|
| JP | 02-251545 A | 10/1990 |
| JP | 07-246322 A | 9/1995 |
| JP | 10-263374 A | 10/1998 |
| JP | 2000-317280 A | 11/2000 |
| JP | 2010-022935 A | 2/2010 |
| JP | 2010-053245 A | 3/2010 |
| JP | 2010-202828 A | 9/2010 |
| JP | 2010-234344 A | 10/2010 |
| JP | 2011-233542 A | 11/2011 |
| WO | 2014/181760 A1 | 11/2014 |

OTHER PUBLICATIONS

Office Action for corresponding Japanese Patent Application No. 2019-567750, dated Feb. 18, 2020.
Office Action for corresponding Japanese Patent Application No. 2019-567750, dated Jun. 30, 2020.
International Search Report for PCT/JP2019/028817, dated Oct. 15, 2019.

* cited by examiner

*Primary Examiner* — Dirk R Bass
(74) *Attorney, Agent, or Firm* — Sughrue Mion, PLLC

(57) ABSTRACT

The present disclosure provides a substrate for a liquid filter, including: a polyolefin microporous membrane, in which a mean flow pore size in a pore size distribution of the polyolefin microporous membrane measured by a half dry method according to gas-liquid phase substitution is from 1 nm to 50 nm, a calcium content in the polyolefin microporous membrane is 2,000 ppb or less, and a ratio of a tensile elongation in a longitudinal direction (MD) to a tensile elongation in a width direction (TD) perpendicular to the longitudinal direction (MD/TD tensile elongation ratio) of the polyolefin microporous membrane is from 0.47 to less than 0.96 or from more than 1.25 to 7.

9 Claims, No Drawings

BASE MATERIAL FOR LIQUID FILTERS

CROSS REFERENCE TO RELATED APPLICATIONS

This application is a National Stage of International Application No. PCT/JP2019/028817 filed Jul. 23, 2019, claiming priority based on Japanese Patent Application No. 2018-139729 filed Jul. 25, 2018.

TECHNICAL FIELD

The present disclosure relates to a substrate for a liquid filter.

BACKGROUND ART

In recent years, electronic devices are becoming increasingly smaller with higher performance. In particular, digital devices and portable terminals, as typified by personal computers and smartphones, have been dramatically developed. Among various techniques leading and supporting such development, as is well known, technological innovation in the semiconductor industry has played a major role. In the recent semiconductor industry, the development race is going on in the field where the wiring pattern dimension is below 20 nm, and the manufacturers have been accelerating the construction of cutting-edge production lines.

A lithography step is a step of forming a pattern in the production of semiconductor parts. With the recent development of finer patterns, an extremely high level of technology has been required not only in terms of the nature of the liquid chemical used in a lithography step itself but also for the handling of the liquid chemical prior to application onto a wafer.

A liquid chemical prepared at a high level is filtered through a dense filter immediately before application onto a wafer to remove particles that would greatly affect the pattern formation or yield. In the cutting-edge formation of patterns of less than 20 nm, the capability of collecting particles of less than about 10 nm is required, and filter manufacturers are vigorously advancing the development.

Generally, a liquid filter contains, as a substrate, a porous membrane made of a resin such as polyethylene, polytetrafluoroethylene, nylon, or polypropylene, and is processed into the form of a cartridge and used. Substrates are used according to the intended application in terms of compatibility with the liquid chemical, collection efficiency, processing capacity, life, and the like. Recently, the reduction of dissolved matter derived from the substrate has been particularly emphasized, and a further reduction of dissolved matter has been required even in polyethylene microporous membranes that have naturally low dissolution.

As typical methods for producing a polyethylene microporous membrane, a phase separation method and a drawing method can be mentioned. A phase separation method is a technique that forms pores utilizing the phase separation phenomenon of a polymer solution. Examples thereof include a heat-induced phase separation method in which phase separation is induced by heat as described in Japanese Patent Application Laid-Open (JP-A) No. H02-251545 and a non-solvent-induced phase separation method utilizing the solubility characteristics of a polymer to the solvent. In addition, it is also possible to combine the two techniques, the heat-induced phase separation method and the non-solvent-induced phase separation method, and to further adjust the shape or size of the pore structure by drawing to increase the variation. A drawing method is, for example, as described in JP-A No. 2010-053245, JP-A No. 2010-202828, JP-A No. H07-246322, JP-A No. H10-263374, International Publication (WO) No. 2014/181760, and JP-A No. 2011-233542, a method in which a polyethylene raw sheet formed in a sheet shape is drawn to extend the amorphous part in the crystal structure under adjusted drawing conditions including the speed, ratio, temperature, and the like, thereby forming micropores between lamellar layers while forming microfibrils.

However, in the conventional arts as described in JP-A No. H02-251545, JP-A No. 2010-053245, JP-A No. 2010-202828, JP-A No. H07-246322, JP-A No. H10-263374, and WO No. 2014/181760, a membrane is produced using polyethylene containing a large amount of metal derived from a polymerization catalyst and an additive, and the contact area with the liquid extremely increases due to the membrane pores becoming smaller, and thus the amount of dissolution of metal ions from a substrate extremely increases. When a liquid filter cartridge is produced using this substrate, so much time and solvent such as water are required for washing the substrate, and therefore, the washing step has been desired to become more efficient. In particular, in terms of obtaining both collection efficiency for fine particles of less than about 10 nm and liquid permeability as described in WO No. 2014/181760, an important problem is solved as a semiconductor precision filter. However, for the membrane having finer pores, there is a strong need to make the production of a filter cartridge more efficient, as described above. In addition, JP-A No. 2011-233542 mentions the content of metal ions but relates to a polyolefin microporous membrane that is applied to a battery separator, and the polyolefin microporous membrane is not considered and designed at all as a semiconductor precise filter.

SUMMARY OF INVENTION

Technical Problem

Thus, in order to solve the problems described above, an object of the disclosure is to provide a substrate for a liquid filter, which has both high liquid permeability and fine particle collection efficiency and can improve production efficiency of a filter cartridge.

Solution to Problem

In order to solve the above problems, the disclosure is configured as follows.

[1] A substrate for a liquid filter, including: a polyolefin microporous membrane, in which a mean flow pore size in a pore size distribution of the polyolefin microporous membrane measured by a half dry method according to gas-liquid phase substitution is from 1 nm to 50 nm, a calcium content in the polyolefin microporous membrane is 2,000 ppb or less, and a ratio of a tensile elongation in a longitudinal direction (MD) to a tensile elongation in a width direction (TD) perpendicular to the longitudinal direction (MD/TD tensile elongation ratio) of the polyolefin microporous membrane is from 0.47 to less than 0.96 or from more than 1.25 to 7.

[2] The substrate for a liquid filter according to [1], in which the tensile elongation in the width direction (TD) of the polyolefin microporous membrane is from 20% to 120%.

[3] The substrate for a liquid filter according to [2], in which the tensile elongation in the width direction (TD) of the polyolefin microporous membrane is from 20% to less than 90%.

[4] The substrate for a liquid filter according to any one of [1] to [3], in which a shrinkage ratio in the longitudinal direction (MD) of the polyolefin microporous membrane after being left for 10 minutes at 80° C. is less than 20%.

[5] The substrate for a liquid filter according to any one of [1] to [4], in which a polyolefin configuring the polyolefin microporous membrane is a polyethylene composition containing a high-molecular-weight polyethylene having a weight-average molecular weight of from 3,000,000 to 6,000,000 and a low-molecular-weight polyethylene having a weight-average molecular weight of from 200,000 to 800,000.

[6] The substrate for a liquid filter according to any one of [1] to [5], in which a porosity of the polyolefin microporous membrane is from 35% to 70%.

[7] The substrate for a liquid filter according to [6], in which the porosity of the polyolefin microporous membrane is from 41% to 70%.

[8] The substrate for a liquid filter according to any one of [1] to [7], in which a water permeation efficiency of the polyolefin microporous membrane under a reduced pressure of 90 kPa in terms of 10 μm thickness is from 0.10 mL/min/cm$^2$ to 2.00 mL/min/cm$^2$.

[9] The substrate for a liquid filter according to any one of [1] to [8], in which a thickness of the polyolefin microporous membrane is from 1 μm to 50 μm.

Advantageous Effects of Invention

According to the disclosure, a substrate for a liquid filter, which has both high liquid permeability and fine particle collection efficiency and can improve production efficiency of a filter cartridge, can be provided.

DESCRIPTION OF EMBODIMENTS

Hereinafter, embodiments of the present invention will be sequentially described. However, these descriptions and examples are illustrative of the invention, and do not limit the scope of the invention. Incidentally, throughout this description, a numerical range using "to" includes its upper limit and lower limit. Regarding a polyolefin microporous membrane, the term "longitudinal direction" means a longitudinal direction of the polyolefin microporous membrane produced in an elongated shape, and the term "width direction" means a direction perpendicular to the longitudinal direction of the polyolefin microporous membrane. Hereinafter, the "width direction" is also referred to as "TD", and the "longitudinal direction" is also referred to as "MD".

[Substrate for Liquid Filter]

A substrate for a liquid filter of the disclosure is a substrate for a liquid filter, including: a polyolefin microporous membrane, in which a mean flow pore size in a pore size distribution of the polyolefin microporous membrane measured by a half dry method according to gas-liquid phase substitution is from 1 nm to 50 nm, a calcium content in the polyolefin microporous membrane is 2,000 ppb or less, and a ratio of a tensile elongation in a longitudinal direction (MD) to a tensile elongation in a width direction (TD) perpendicular to the longitudinal direction (MD/TD tensile elongation ratio) of the polyolefin microporous membrane is from 0.47 to less than 0.96 or from more than 1.25 to 7.

In the disclosure, since the mean flow pore size is from 1 nm to 50 nm, fine particles can be collected. Generally, in a case in which the mean flow pore size is small, the flow rate passing through pores during filtration becomes small, and thus much time is required for washing. However, in the disclosure, since the ratio of the tensile elongation in the longitudinal direction (MD) to the tensile elongation in the width direction (TD) perpendicular to the longitudinal direction (MD/TD tensile elongation ratio) of the polyolefin microporous membrane is from 0.47 to less than 0.96 or from more than 1.25 to 7, the shape of pores is an elliptical shape, and the flow rate is less likely to be lowered even in a case in which fine particles are collected in the pores during filtration. Therefore, washing can be performed in a shorter time than ever before. In addition, since the calcium content in the polyolefin microporous membrane is extremely low, 2,000 ppb or less, the amount of dissolution of calcium is low, and the washing can be performed in a short time. The reduction of the washing time can improve production efficiency of a filter cartridge.

According to the disclosure, both high liquid permeability and fine particle collection efficiency can be obtained, and production efficiency of a filter cartridge can be improved. Hereinafter, each configuration will be described in detail.

(Polyolefin Microporous Membrane)

The polyolefin microporous membrane, which is the substrate for a liquid filter of the disclosure, is a microporous membrane that contains a polyolefin. Here, the microporous membrane means a membrane having a large number of micropores inside and having a structure in which the micropores are connected to each other so that gas or liquid can pass from one surface to the other surface.

It is preferable that the polyolefin microporous membrane has a polyolefin content of 90 parts by mass or more with respect to 100 parts by mass of the polyolefin microporous membrane, and an additive such as an organic filler, an inorganic filler, or a surfactant may be contained as the balance as long as the effects of the disclosure are not impaired.

(Mean Flow Pore Size)

In the disclosure, the polyolefin microporous membrane has a mean flow pore size in a pore size distribution of the polyolefin microporous membrane measured by a half dry method according to gas-liquid phase substitution of from 1 nm to 50 nm. In a case in which the mean flow pore size of the polyolefin microporous membrane is 1 nm or more, sufficient liquid permeability can be obtained. From such a viewpoint, the mean flow pore size is preferably 10 nm or more, more preferably 13 nm or more, and still more preferably 15 nm or more. Meanwhile, in a case in which the mean flow pore size of the polyolefin microporous membrane is 50 nm or less, fine particles of, for example, about 10 nm can be extremely highly collected. From such a viewpoint, the mean flow pore size is preferably 40 nm or less, more preferably 30 nm or less, still more preferably 25 nm or less, and particularly preferably 20 nm or less.

(Calcium Content)

In the disclosure, the calcium content in the polyolefin microporous membrane is 2,000 ppb or less. In a case in which the calcium content is 2,000 ppb or less, washing time when a filter cartridge is produced can be significantly reduced, and furthermore, a solvent such as water used in washing can also be greatly reduced. From such a viewpoint, the calcium content of the polyolefin microporous membrane is preferably 1,500 ppb or less, more preferably 1,300 ppb or less, still more preferably 1,000 ppb or less, and particularly preferably 800 ppb or less. Meanwhile, from the viewpoint of production efficiency of a filter cartridge, the calcium content as low as possible is preferable. However, realistically speaking, a trace of calcium is sometimes contained in a raw material for production or incorporated in a production step of the polyolefin microporous membrane, and thus it is difficult to reduce the calcium content. The calcium content of the polyolefin microporous membrane is preferably 0 ppb or more, more preferably 1 ppb or more, still more preferably 10 ppb or more, and particularly preferably 50 ppb or more. In a case in which the calcium content is 2,000 ppb or less, the production efficiency of a filter cartridge can be drastically improved.

In the disclosure, the polyolefin microporous membrane having fine pores, in which the mean flow pore size is from 1 nm to 50 nm, is applied. In such a polyolefin microporous membrane having fine pores, a specific surface area becomes dramatically large, and metal ions to be dissolved or the like tend to increase. However, in a case in which the calcium content is 2,000 ppb or less, the production efficiency of a filter cartridge can be drastically improved even in such a polyolefin microporous membrane having fine pores. In addition, in a case in which the calcium content of the polyolefin microporous membrane is 1 ppb or more, chloride ions derived from a polymerization catalyst, which would remain in the polyolefin in minute amounts, can be sufficiently neutralized, and corrosion of piping made of stainless steel or the like in a production facility of the polyolefin microporous membrane is prevented. From such a viewpoint, the calcium content of the polyolefin microporous membrane is preferably 10 ppb or more, and more preferably 50 ppb or more.

In the disclosure, a method of adjusting the calcium content of the polyolefin microporous membrane to 2,000 ppb or less is not particularly limited. Examples thereof include using a material having a calcium content of from 0 ppb to 1,000 ppb as a polyolefin raw material configuring the polyolefin microporous membrane and washing with an acid or the like for a long time after the polyolefin microporous membrane is produced. From the viewpoint that the calcium content can be sufficiently reduced to the inside of the polyolefin microporous membrane, preferably, a polyolefin raw material having a low calcium content is used.

(MD/TD Tensile Elongation Ratio)

In the disclosure, the ratio of the tensile elongation in the longitudinal direction (MD) to the tensile elongation in the width direction (TD) perpendicular to the longitudinal direction (MD/TD tensile elongation ratio) of the polyolefin microporous membrane is from 0.47 to less than 0.96 or from more than 1.25 to 7.

In a case in which the MD/TD tensile elongation ratio is less than 0.96, when great pressure is applied to the polyolefin microporous membrane from a fluid during the use of a liquid filter, elongation in the width direction becomes large, whereas elongation in the longitudinal direction is small. Therefore, the pores are prevented from deforming in one direction but flexibly deform in the other direction, and both sufficient collection efficiency and flow rate can be obtained even in the fine porous structure in which the mean flow pore size is from 1 nm to 50 nm. From such a viewpoint, the MD/TD tensile elongation ratio is preferably 0.95 or less, and more preferably 0.90 or less. Meanwhile, in a case in which the MD/TD tensile elongation ratio is 0.47 or more, shrinkage in the longitudinal direction hardly occurs due to conveying tensile force of the membrane during the production of the polyolefin microporous membrane and during the production of a cartridge, and the production efficiency is likely to be improved. From such a viewpoint, the MD/TD tensile elongation ratio is preferably 0.50 or more, and more preferably 0.60 or more.

In a case in which the MD/TD tensile elongation ratio is more than 1.25, when great pressure is applied to the polyolefin microporous membrane from a fluid during the use of a liquid filter, elongation in the longitudinal direction becomes large, whereas elongation in the width direction is small. Therefore, the pores are prevented from deforming in one direction but flexibly deform in the other direction, and both sufficient collection efficiency and flow rate can be obtained even in the fine porous structure in which the mean flow pore size is from 1 nm to 50 nm. From such a viewpoint, the MD/TD tensile elongation ratio is preferably 1.30 or more, and still more preferably 1.50 or more. Meanwhile, in a case in which the MD/TD tensile elongation ratio is 7 or less, shrinkage in the width direction hardly occurs due to conveying tensile force of the membrane during the production of the polyolefin microporous membrane and during the production of a cartridge, and the production efficiency is likely to be improved. From such a viewpoint, the MD/TD tensile elongation ratio is preferably 6 or less, and more preferably 5 or less.

A method of controlling the porous structure of the polyolefin microporous membrane is not particularly limited. For example, the porous structure can be controlled by the composition of a polyolefin resin, the concentration of the polyolefin resin in a raw material, the mixing ratio of multiple solvents used in the raw material, a heating temperature for expressing a solvent from the inside of the extruded sheet, a pressing temperature, a heating time, a draw ratio, a heat treatment (heat setting) temperature after drawing, an immersion time in an extraction solvent, annealing treatment temperature and time, and the like.

(TD Tensile Elongation)

In the disclosure, the tensile elongation in the width direction (TD) of the polyolefin microporous membrane is preferably from 20% to 120%. In a case in which the TD tensile elongation of the polyolefin microporous membrane is 120% or less, the elongation of the polyolefin microporous membrane when a fluid pressure is changed during the use of a filter cartridge hardly occurs. Thus, for example, when the fluid pressure increases, problems such as the leakage of collected foreign matters and the deterioration of fluid permeability hardly occur. From such a viewpoint, the TD tensile elongation is more preferably 90% or less, still more preferably less than 90%, particularly preferably 85% or less, and still more preferably 80% or less. Meanwhile, in a case in which the TD tensile elongation is 20% or more, handling is easy during the production of the polyolefin microporous membrane and during the production of a liquid filter cartridge, and, when external stress is applied to the polyolefin microporous membrane, the stress can be absorbed by the deformation of the membrane, and an abnormality such as a crack hardly occurs. From such a viewpoint, the TD tensile elongation is more preferably 25% or more, and still more preferably 30% or more.

(MD Tensile Elongation)

In the disclosure, the tensile elongation in the longitudinal direction (MD) of the polyolefin microporous membrane is preferably from 30% to 200%. In a case in which the MD tensile elongation of the polyolefin microporous membrane is 200% or less, the elongation of the polyolefin microporous membrane when a fluid pressure is changed during the use of a filter cartridge hardly occurs. Thus, for example, when the fluid pressure increases, problems such as the leakage of collected foreign matters and the deterioration of fluid permeability hardly occur. From such a viewpoint, the MD tensile elongation is more preferably 150% or less, and still more preferably 120% or less. Meanwhile, in a case in which the MD tensile elongation is 30% or more, handling is easy during the production of the polyolefin microporous membrane and during the production of a liquid filter cartridge, and, when external stress is applied to the polyolefin microporous membrane, the stress can be absorbed by the deformation of the membrane, and an abnormality such as a crack hardly occurs. From such a viewpoint, the MD tensile elongation is more preferably 50% or more, still more preferably 60% or more, and particularly preferably 65% or more.

(Thickness)

In the disclosure, the thickness of the polyolefin microporous membrane is preferably from 1 µm to 50 µm. The thickness of the polyolefin microporous membrane of 1 µm or more is preferable because sufficient dynamic strength is likely to be obtained, and handleability during the processing of the polyolefin microporous membrane and the like, and durability in the long-term use of a filter cartridge are likely to be obtained. From such a viewpoint, the thickness of the polyolefin microporous membrane is more preferably 3 µm or more, still more preferably 5 µm or more, and particularly preferably 6 µm or more. Meanwhile, the thickness of 50 µm or less is preferable because the thickness variation in the width direction is reduced, and sufficient liquid permeability can be obtained with the polyolefin microporous membrane singly. In addition, in a filter cartridge of a predetermined size, a larger filtration area is likely to be obtained, thereby facilitating the flow rate design and structural design of the filter during the processing of the polyolefin microporous membrane. From such a viewpoint, the thickness of the polyolefin microporous membrane is more preferably 30 µm or less, still more preferably 20 µm or less, and particularly preferably 15 µm or less.

For example, assuming the placement of a filter cartridge in a housing of the same size, as a filter medium (the whole constituent material including the substrate for a filter) becomes thinner, a filter medium area can be made larger, so that a high-flow-rate/low-filtration-pressure design which is preferable as a liquid filter can be achieved. That is, it becomes possible to design a liquid filter such that the filtration pressure decreases in a case in which the same flow rate is to be maintained while the flow rate increases in a case in which the same filtration pressure is to be maintained. In particular, when the filtration pressure decreases, it becomes much less likely that foreign matters once collected are continuously exposed to the filtration pressure in the filter medium, thus are pushed out from the inside of the filter medium with the lapse of time together with the filtrate, and leak out. Moreover, when the filtration pressure decreases, it becomes much less likely that a gas dissolved and present in the liquid to be filtered appears in the form of fine bubbles due to the pressure difference before and after filtration (pressure decrease after filtration). Furthermore, it becomes likely that the filtration yield of the filtration object such as a liquid chemical is improved, and the quality of the filtration object such as a liquid chemical is maintained at a high level over a long period of time.

Meanwhile, as the filter medium becomes thinner, the strength and durability performance of the filter medium are lowered. However, for example, in designing a filter, it is also possible to combine the filter with a coarse high-strength support for reinforcement (for example, processing to stack the filter and the support and fold the stack) to adjust the designing of durability and flow rate.

(Porosity)

In the disclosure, the porosity of the polyolefin microporous membrane is preferably from 35% to 70%. In a case in which the porosity of the polyolefin microporous membrane is 35% or more, a liquid permeation efficiency becomes favorable, and the porosity is more preferably 40% or more, still more preferably 41% or more, and particularly preferably 45% or more from such a viewpoint. Meanwhile, the porosity of 70% or less is preferable in that the dynamic strength of the polyolefin microporous membrane becomes favorable, and handleability is also improved. From such a viewpoint, the porosity of the polyolefin microporous membrane is more preferably 65% or less. Here, the porosity ($\varepsilon$) of the polyolefin microporous membrane is calculated by the following Formula.

$$\varepsilon(\%) = \{1 - Ws/(ds \cdot t)\} \times 100$$

Ws: Weight per unit area of polyolefin microporous membrane (g/m$^2$)

ds: True density of polyolefin (g/cm$^3$)

t: Thickness of polyolefin microporous membrane (µm)

(Water Permeation Efficiency (Water Flow Rate))

In the disclosure, the water permeation efficiency of the polyolefin microporous membrane under a reduced pressure of 90 kPa in terms of 10 µm thickness is preferably from 0.10 mL/min/cm$^2$ to 2.00 mL/min/cm$^2$. The water permeation efficiency of the polyolefin microporous membrane of 0.10 mL/min/cm$^2$ or more is preferable because not only water permeation efficiency as a liquid filter is likely to be sufficiently obtained but also the stability of solution feeding through the filter (for example, the stability of a power load for maintaining a constant solution feeding amount and the stability of a solution feeding amount under a constant solution feeding pressure (constant power load)) are likely to be obtained over a long period of time. From such a viewpoint, the water permeation efficiency of the polyolefin microporous membrane is more preferably 0.15 mL/min/cm$^2$ or more. Meanwhile, the water permeation efficiency of the polyolefin microporous membrane of 2.00 mL/min/cm$^2$ or less is preferable because fine particles of, for example, about 10 nm or less are likely to be highly collected.

(MD Heat Shrinkage Ratio)

In the disclosure, the shrinkage ratio in the longitudinal direction (MD) of the polyolefin microporous membrane after being left for 10 minutes at 80° C. is preferably less than 20%. In a case in which the MD shrinkage ratio is less than 20%, when the polyolefin microporous membrane is immersed in a liquid such as a liquid to be treated of a filter, the membrane hardly deforms, and the solvent-resistant dimensional stability is improved. From such a viewpoint, the MD shrinkage ratio is more preferably 15% or less, and still more preferably 10% or less.

(Polyolefin)

In the disclosure, as the polyolefin configuring the polyolefin microporous membrane, for example, a homopolymer or copolymer of polyethylene, polypropylene, polybutylene, polymethylpentene, or the like, or a mixture of one or more kinds thereof can be used. Among them, polyethylene is preferable. As polyethylene, high-density polyethylene, a mixture of high-density polyethylene and ultra-high-molecular-weight polyethylene, or the like is suitable. Polyethylene may be used in combination with other components. Examples of the components other than polyethylene include polypropylene, polybutylene, polymethylpentene, and a copolymer of polypropylene and polyethylene. Polyolefins that are different in properties may be used in combination. Specifically, polyolefins that are different in polymerization degree or branching degree and poorly compatible with each other, in other words, polyolefins that are different in crystallinity, stretchability or molecular orientation may be used in combination.

In particular, as the polyolefin used in the disclosure, it is preferable to use a polyethylene composition obtained by mixing a high-molecular-weight polyethylene having a weight-average molecular weight of from 3,000,000 to 6,000,000 with a low-molecular-weight polyethylene having a weight-average molecular weight of from 200,000 to 800,000. Blending of suitable amounts of two or more kinds of polyethylenes is effective in, during drawing, forming a network web structure associated with fibrillation and increasing the occurrence of pores.

In particular, the blending ratio of the high-molecular-weight polyethylene and the low-molecular-weight polyethylene is preferably from 50:50 to 80:20 by mass ratio.

As the low-molecular-weight polyethylene, high-density polyethylene having a density of from 0.92 g/cm$^3$ to 0.98 g/cm$^3$ is preferable.

The weight-average molecular weight is determined by dissolving a polyolefin microporous membrane sample in o-dichlorobenzene by heating, and performing measurement under conditions of a column temperature of 135° C. and a flow velocity of 1.0 mL/min using GPC (Alliance GPC 2000 manufactured by Waters Corporation, columns; GMH6-HT and GMH6-HTL). Monodisperse polystyrene (manufactured by Tosoh Corporation) can be used for calibrating the molecular weight.

In the disclosure, the polyolefin configuring the polyolefin microporous membrane has a calcium content of preferably from 0 ppb to 1,000 ppb, more preferably from 50 ppb to 500 ppb, and still more preferably from 100 ppb to 300 ppb.

Examples of a method of adjusting the calcium content to 1,000 ppb or less include a method of adjusting the amount of metallic soap (calcium stearate or the like) to be added to the polyolefin after polymerization. In addition, examples thereof also include an adjusting method by acid washing of a commercial polyolefin raw material.

[Liquid Filter]

The substrate for a liquid filter of the disclosure as described above is, after suitable processing to impart compatibility with a liquid chemical, processed into a cartridge form, which can be used as a liquid filter. The liquid filter is an instrument for removing particles made of at least one of an organic substance or an inorganic substance from a liquid to be treated which contains or may contain the particles. In the liquid to be treated, the particles are present in the form of a solid or a gel. The disclosure is suitable for removing extremely fine particles having a particle size of about several nanometers. The liquid filter may also be used in not only a semiconductor production step but also other production steps such as display production and polishing.

As a substrate for a liquid filter, a porous substrate made of polytetrafluoroethylene and the like is well known, for example. In a case in which the substrate composed of the polyolefin microporous membrane of the disclosure described above is used as a substrate for a liquid filter, the substrate has higher compatibility with a liquid chemical than that of a polytetrafluoroethylene porous substrate. Accordingly, the processing to impart compatibility with the liquid chemical to the filter is facilitated, for example. In a case in which the filter cartridge is placed in a filter housing to start filtration, and the filter is filled with a liquid chemical, an air pocket is less likely to be formed in the filter cartridge, resulting in improved yield of liquid chemical filtration. Furthermore, since a polyethylene structure itself does not contain a halogen element, the used filter cartridge is easy to be handled, which is effective in reducing the environmental load, for example.

[Method of Producing Polyolefin Microporous Membrane and Method of Controlling Pore Structure]

The polyolefin microporous membrane, which is the substrate for a liquid filter of the disclosure, can be preferably produced by the following method. That is, the polyolefin microporous membrane can be preferably produced by sequentially performing the following steps:

(I) a step of preparing a solution containing a polyolefin composition and a solvent;

(II) a step of melt-kneading the prepared solution, extruding the obtained melt-kneaded product from a die, and cooling and solidifying the melt-kneaded product to obtain a gel-like molded product;

(III) a step of previously expressing a part of the solvent from the gel-like molded product;

(IV) a step of drawing the gel-like molded product, from which a part of the solvent has been expressed, in at least one direction; and (V) a step of extracting and washing the solvent from the inside of the drawn intermediate molded product.

In the step (I), a solution containing a polyolefin composition and a solvent is prepared. The solvent is preferably at least a volatile solvent having a boiling point of less than 210° C. at atmospheric pressure. The solution is preferably a thermally reversible sol-gel solution. In the step (I), specifically, the polyolefin composition is dissolved by heating in the solvent to form a sol, thereby preparing a thermally reversible sol-gel solution. The volatile solvent having a boiling point of less than 210° C. at atmospheric pressure is not particularly limited as long as it can swell or dissolve the polyolefin, and preferred examples thereof include liquid solvents such as tetralin, ethylene glycol, decalin, toluene, xylene, diethyltriamine, ethylenediamine, dimethyl sulfoxide, and hexane. These solvents may be used singly or in combination of two or more. Among them, decalin or xylene is preferable. In the preparation of the solution, in addition to the volatile solvent having a boiling point of less than 210° C. at atmospheric pressure described above, it is also possible to add a non-volatile solvent having a boiling point of 210° C. or more, such as liquid paraffin, paraffin oil, mineral oil, or castor oil.

In the solution in the step (I), from the viewpoint of controlling the liquid permeation performance of the polyolefin microporous membrane and the removal performance as a filter medium, the concentration of the polyolefin composition is preferably from 15% by mass to 40% by mass, and more preferably from 20% by mass to 30% by mass. In a case in which the concentration of the polyolefin composition is 15% by mass or more, the dynamic strength tends not to become too low, thereby favorably maintaining handleability, and furthermore, occurrence frequency of breakage in the formation of the polyolefin microporous membrane tends to be suppressed. In addition, in a case in which the concentration of the polyolefin composition is 40% by mass or less, pores tend to be easily formed.

In the step (II), the solution prepared in the step (I) is melt-kneaded, and the obtained melt-kneaded product is extruded from a die and then cooled and solidified to obtain a gel-like molded product. It is preferable that extrusion from a die is performed at a temperature within a range of from the melting point of the polyolefin composition to a temperature higher than the melting point by 65° C. to obtain an extruded product, and then the extruded product is cooled to obtain a gel-like molded product. It is preferable that the molded product is formed into a sheet shape.

A method of cooling the extruded product is not particularly limited, and a method based on quenching with water or an organic solvent and a method based on casting on a cooled metal roll may be used. Generally, a method based on quenching with water or the volatile solvent used for the sol-gel solution is used. The cooling temperature is preferably from 10° C. to 40° C. It is preferable that a water flow is provided on the surface layer of a water bath, and a gel-like sheet is produced while preventing the mixed solvent released from a gelled sheet in the water bath and floating on the water surface from re-adhering to the sheet.

The step (III) is a step of, before drawing the gel-like molded product in at least one direction, previously expressing a part of the solvent in the gel-like molded product. The step (III) can be suitably performed by, for example, applying a pressure to the surface of the gel-like molded product by a method in which the product is passed through the gap between upper and lower two belts or rollers, and the like. The amount of the solvent to be expressed has to be adjusted according to the required liquid permeation performance and filtration object removal performance of the polyolefin microporous membrane. Specifically, the adjustment can be made within an appropriate range with the pressing pressure between the upper and lower belts or rollers, the temperature in the expression step, and the number of presses. The pressure that the gel-like molded product receives is preferably set to be within a range of from 0.01 MPa to 0.5 MPa using a roller or the like. The pressure is still more preferably within a range of from 0.05 MPa to 0.2 MPa. The expression temperature is preferably from 40° C. to 100° C. The number of presses depends on the space allowance in the facility, and thus pressing can be set without particular limitation. If necessary, single-stage or multistage preheating may be performed before solvent expression to remove a part of the volatile solvent from the inside of the sheet. In this case, the preheating temperature is preferably from 50° C. to 100° C. The preheating is preferably performed for 5 to 9 minutes per stage. In this case, the amount of the volatile solvent to be removed is adjusted by a conveying distance and a conveying speed in a heating device.

The step (IV) is a step of drawing the gel-like molded product in at least one direction. Drawing in the step (IV) is preferably biaxial drawing, and either of sequential biaxial drawing, in which longitudinal drawing and lateral drawing are separately performed, or simultaneous biaxial drawing, in which longitudinal drawing and lateral drawing are simultaneously performed, can be suitably used. A method in which the product is drawn in the longitudinal direction several times and then drawn in the lateral direction, a method in which the product is drawn in the longitudinal direction and drawn in the lateral direction several times, and a method in which the product is sequentially biaxially drawn and then further drawn in the longitudinal direction and/or in the lateral direction once or several times are also preferable.

From the viewpoint of controlling the liquid permeation performance and filtration object removal performance of the polyolefin microporous membrane, the draw ratio (the product of the longitudinal draw ratio and the lateral draw ratio) is preferably from 40 times to 105 times, and more preferably from 50 times to 100 times. In a case in which the draw ratio increases, occurrence frequency of breakage in the formation of the polyolefin microporous membrane tends to increase. In a case in which the draw ratio decreases, the thickness tends to be less uniform. Drawing is preferably performed with the solvent remaining in a suitable state. The drawing temperature is preferably from 80° C. to 125° C. The drawing temperature is particularly preferably from 100° C. to 120° C.

After drawing in the step (IV), heat setting treatment may be performed.

From the viewpoint of controlling the liquid permeation performance and filtration object removal performance of the polyolefin microporous membrane, the heat setting temperature is preferably from 100° C. to 143° C. The heat setting temperature is still more preferably from 105° C. to 138° C. In a case in which the heat setting temperature increases, the filtration object removal performance of the polyolefin microporous membrane tends to significantly decrease. In a case in which the heat setting temperature decreases, the liquid permeation performance tends to significantly decrease.

The step (V) is a step of, in order to extract the solvent from the inside of the drawn intermediate molded product, washing the drawn intermediate molded product. In the step (V), in order to extract the solvent from the inside of the drawn intermediate molded product (drawn film), washing is preferably performed with a halogenated hydrocarbon solvent such as methylene chloride or a hydrocarbon solvent such as hexane. In a case in which washing is performed by immersion in a tank filled with a solvent, in order to obtain a polyolefin microporous membrane with low dissolution, washing is preferably performed for from 20 seconds to 150 seconds, more preferably from 30 seconds to 150 seconds, and particularly preferably from 30 seconds to 120 seconds. Furthermore, in order to further improve the effect of washing, it is preferable that the tank is divided into several stages, and the washing solvent is poured from the downstream side of the conveying step of the polyolefin microporous membrane for making the washing solvent flow toward the upstream side of the conveying step so that the purity of the washing solvent in a downstream tank is higher than that in an upstream tank. Depending on the performance requirements for the polyolefin microporous membrane, heat setting may be performed by annealing treatment. From the viewpoint of conveying properties in the step or the like, the annealing treatment is preferably performed at from 50° C. to 150° C., and still more preferably performed at from 50° C. to 140° C.

EXAMPLES

Hereinafter, examples, comparative examples, and various measurement methods of the disclosure will be described. However, the disclosure is not limited to these examples.

[Measurement Methods]
(Mean Flow Pore Size)

The mean flow pore size according to gas-liquid phase substitution was measured by a pore size distribution measurement test method [half dry method (ASTM E 1294-89)] using a Perm Porometer porous material automatic micropore size distribution measurement system [Capillary Flow Porometer] manufactured by PMI Co., Ltd. A fluorinated inert liquid (trade name: Fluorinert) was used as a test solution (interfacial tension value: 16.0 mN/m), the measurement temperature was 25° C., the measurement pressure was within a range of from 0 MPa to 3.45 MPa, and the measurement was performed under the following conditions.

Bubble point parameter: BUBLFLOW=50, F/PT=100, MINBPPRES=0, ZEROTIME=1, PULSEDELAY=2

Wet parameter: V2INCR=15, PREGINC=0.9, MINEQ-TIME=30, PRESSLEW=30, FLOWSLEW=30, EQITER=50, AVEITER=10, MAXPDIF=1, MAXFDIF=30

Dry parameter: V2INCR=40, PREGINC=2.4, MINEQ-TIME=30, PRESSLEW=30, FLOWSLEW=30, EQITER=40, AVEITER=10, MAXPDIF=1, MAXFDIF=30

(Thickness)

The thickness of the polyolefin microporous membrane was measured at 20 points using a contact thickness gauge (manufactured by Mitutoyo Corporation), and the results were averaged to determine the thickness. As a contact terminal, a terminal having a cylindrical shape with a bottom face having a diameter of 0.5 cm was used. The measurement pressure was 0.1 N.

(Porosity)

The porosity ($\varepsilon$) of the polyolefin microporous membrane was calculated by the following Formula.

$$\varepsilon(\%) = \{1 - Ws/(ds \cdot t)\} \times 100$$

Ws: Weight per unit area of polyolefin microporous membrane ($g/m^2$)

ds: True density of polyolefin ($g/cm^3$)

t: Thickness of polyolefin microporous membrane ($\mu m$)

The weight per unit area of the polyolefin microporous membrane was determined by cutting out a sample of 10 cm×10 cm, measuring the mass thereof, and dividing the mass by the area.

(Weight-Average Molecular Weight of Polyolefin)

The weight-average molecular weight was determined by dissolving a polyolefin microporous membrane sample in o-dichlorobenzene by heating, and performing measurement under conditions of a column temperature of 135° C. and a flow velocity of 1.0 mL/min using GPC (Alliance GPC 2000 manufactured by Waters Corporation, columns; GMH6-HT and GMH6-HTL). Monodisperse polystyrene (manufactured by Tosoh Corporation) was used for calibrating the molecular weight.

(Calcium Content (Amount of Ca))

In a fluororesin container, 0.1 g of a polyolefin microporous membrane or polyolefin raw powder sample was accurately weighed, ultrapure nitric acid was added to perform microwave decomposition, and the calcium content was quantitated by ICP (Inductively Coupled Plasma) mass spectrometry (ICP-MS, device name: Agilent 7500 cs manufactured by Agilent Technologies, Inc.).

(Amount of Dissolution of Calcium (Ca))

A piece of a polyolefin microporous membrane sample cut out into an A4 size was immersed in ethanol to wash away dust on the surface of the sample. Then, an extra liquid was removed, the sample was placed in a fluororesin container, and 5% by mass hydrochloric acid solution was poured up to 25 mL. The sample was immersed in the container for 24 hours, and then the Ca content in the liquid (the amount of dissolution of Ca) was quantitated by ICP-OES (Inductively Coupled Plasma Optical Emission Spectrometry, device name: Agilent-ICP-OES-5100 manufactured by Agilent Technologies, Inc.).

As the amount of dissolution of calcium is lower, the production efficiency of a filter cartridge becomes more favorable.

(Tensile Elongation)

The polyolefin microporous membrane was cut out along the MD and TD directions to form strip-like specimens (15 mm in width, 50 mm in length), respectively. Each strip-like specimen was pulled using a tensile tester (RTE-1210 manufactured by ORIENTEC Co., LTD.) at a speed of 200 mm/min, and the tensile elongation at the breakage of the specimen was measured.

(80° C. Shrinkage Ratio)

The polyolefin microporous membrane was cut out into an A4 size, and the cutout left to stand for a day was cut out into a size of 10 cm×10 cm. The cutout specimen was placed in an oven set to a temperature of 80° C., and the dimension in the MD direction after 10 minutes was measured. The shrinkage ratio in the MD direction was determined by the following Formula.

$$80° \text{ C. Shrinkage Ratio (\%)} = ((\text{dimension before heating-dimension after heating})/\text{dimension before heating}) \times 100$$

(Solvent-Resistant Dimensional Stability)

The polyolefin microporous membrane was cut out into an A4 size, and the cutout left to stand for a day was cut out into a size of 5 cm×5 cm. The cutout specimens were immersed in liquids: ethanol; isopropyl alcohol; and a surfactant (trade name: Tween 80 manufactured by Tokyo Chemical Industry Co., Ltd.), respectively, for 10 minutes, and the dimensions of MD after immersion were measured. For each specimen, the dimensional change rates were measured based on the following Formula. For the maximum dimensional change rate among the dimensional change rates in each liquid, the solvent-resistant dimensional stability was evaluated by the following evaluation standard. A and B are at a level in which there is practically no problem.

As the dimensional change rate is smaller, the solvent-resistant dimensional stability is more favorable, and the production efficiency of a filter cartridge becomes more favorable.

$$\text{Dimensional Change Rate (\%)} = ((\text{dimension before immersion-dimension after immersion})/\text{dimension before immersion}) \times 100$$

—Evaluation Standard—

A: The dimensional change rate is 7% or less

B: The dimensional change rate is from more than 7% to 10%

C: The dimensional change rate is from more than 10% to 20%

D: The dimensional change rate is more than 20%

(Collection Efficiency)

At a pressure differential of 0.1 MPa, 30 mL of an aqueous solution containing the following particles (1) was filtered through the polyolefin microporous membrane. From the metallic colloid concentration of the mixed solution before filtration (M1) and the metallic colloid concentration of the filtrate that had passed through the polyolefin microporous membrane (M2), the collection rate of the particles was determined by the following Formula. The metallic concentration of the solution was determined with a calibration curve obtained by diluting a standard reagent using ICP-OES, and taking 5 points or more in a concentration range of from 0 ppb to 100 ppb. The collection efficiency was evaluated by the following evaluation standard. A and B are at a level in which there is practically no problem.

Particles (1): gold colloid (manufactured by Funakoshi Co., Ltd.), average particle size 10 nm, particle concentration 40 ppb $$\text{Collection Rate (\%)} = ((M1 - M2)/(M1)) \times 100$$

—Evaluation Standard—
- A: A case in which the collection rate is 70% or more
- B: A case in which the collection rate is from 50% to less than 70%
- C: A case in which the collection rate is from 20% to less than 50%
- D: A case in which the collection rate is less than 20%

(Water Permeation Efficiency (Water Flow Rate))

The polyolefin microporous membrane was pre-immersed in ethanol and dried at room temperature. This polyolefin microporous membrane was set on a liquid permeation cell having a diameter of 37 mm and made of stainless steel (liquid permeation area S cm$^2$). The polyolefin microporous membrane on the liquid permeation cell was wetted with a small amount (0.5 mL) of ethanol. Then, pre-weighed pure water V (100 mL) was passed therethrough at a pressure differential of 90 kPa, and the time T1 (min) taken for the entire amount of pure water to pass was measured. From the amount of pure water and the time taken for the passing of pure water, the water permeation volume Vs per unit time (min) and unit area (cm$^2$) at a pressure differential of 90 kPa was calculated by the following Formula and defined as water permeation efficiency (mL/min cm$^2$). The measurement was performed under a temperature atmosphere at room temperature of 24° C.

$Vs=V/(T1\times S)$

Example 1

A polyethylene composition obtained by mixing 18.4 parts by mass of a high-molecular-weight polyethylene having a Ca content of 140 ppb and a weight-average molecular weight of 5,100,000 (PE1) and 4.6 parts by mass of a low-molecular-weight polyethylene having a Ca content of 270 ppb and a weight-average molecular weight of 650,000 (PE2) was used. A pre-prepared mixed solvent of 74.5 parts by mass of liquid paraffin and 2.5 parts by mass of decalin (decahydronaphthalene) was mixed with the polyethylene composition such that the total polyethylene resin concentration is 23% by mass, thereby preparing a polyethylene solution.

The polyethylene solution was extruded from a die into a sheet shape at a temperature of 155° C. to obtain an extruded product. The extruded product was cooled in a water bath at 20° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape to remove a part of liquid paraffin from the inside of the base tape. Thereafter, the base tape was drawn in the longitudinal direction at a temperature of 115° C. to 5.8 times (longitudinal drawing) and successively drawn in the width direction at a temperature of 105° C. to 13 times (lateral drawing), and then immediately heat treatment (heat setting) was performed at 130° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane, of the disclosure.

The above production conditions are shown in Table 1, and the physical properties of the obtained substrate for a liquid filter are shown in Table 2. The following examples and comparative examples are also similarly summarized in Tables 1 and 2.

Example 2

A polyethylene composition obtained by mixing 18.4 parts by mass of a high-molecular-weight polyethylene having a Ca content of 140 ppb and a weight-average molecular weight of 5,100,000 (PE1) and 4.6 parts by mass of a low-molecular-weight polyethylene having a Ca content of 270 ppb and a weight-average molecular weight of 650,000 (PE2) was used. A pre-prepared mixed solvent of 75.9 parts by mass of liquid paraffin and 1.1 parts by mass of decalin (decahydronaphthalene) was mixed with the polyethylene composition such that the total polyethylene resin concentration is 23% by mass, thereby preparing a polyethylene solution.

The polyethylene solution was extruded from a die into a sheet shape at a temperature of 158° C. to obtain an extruded product. The extruded product was cooled in a water bath at 18° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape to remove a part of liquid paraffin from the inside of the base tape. Thereafter, the base tape was drawn in the longitudinal direction at a temperature of 95° C. to 5.8 times (longitudinal drawing) and successively drawn in the width direction at a temperature of 105° C. to 13 times (lateral drawing), and then immediately heat treatment (heat setting) was performed at 140° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane, of the disclosure.

Example 3

A polyethylene composition obtained by mixing 12.5 parts by mass of a high-molecular-weight polyethylene having a Ca content of 140 ppb and a weight-average molecular weight of 5,100,000 (PE1) and 12.5 parts by mass of a low-molecular-weight polyethylene having a Ca content of 270 ppb and a weight-average molecular weight of 650,000 (PE2) was used. A pre-prepared mixed solvent of 72.5 parts by mass of liquid paraffin and 2.5 parts by mass of decalin (decahydronaphthalene) was mixed with the polyethylene composition such that the total polyethylene resin concentration is 25% by mass, thereby preparing a polyethylene solution.

The polyethylene solution was extruded from a die into a sheet shape at a temperature of 156° C. to obtain an extruded product. The extruded product was cooled in a water bath at 18° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 110° C. while a pressure of 0.05 MPa was applied to the base tape to remove a part of liquid paraffin from the inside of the base tape. Thereafter, the base tape was drawn in the longitudinal direction at a temperature of 115° C. to 5.8 times (longitudinal drawing) and successively drawn in the width direction at a temperature of 105° C. to 13 times (lateral drawing), and then immediately heat treatment (heat setting) was performed at 115° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane, of the disclosure.

Example 4

A polyethylene composition obtained by mixing 6 parts by mass of a high-molecular-weight polyethylene having a Ca content of 140 ppb and a weight-average molecular weight of 5,100,000 (PE1) and 24 parts by mass of a low-molecular-weight polyethylene having a Ca content of 270 ppb and a weight-average molecular weight of 650,000 (PE2) was used. A pre-prepared mixed solvent of 67.5 parts by mass of liquid paraffin and 2.5 parts by mass of decalin (decahydronaphthalene) was mixed with the polyethylene composition such that the total polyethylene resin concentration is 30% by mass, thereby preparing a polyethylene solution.

The polyethylene solution was extruded from a die into a sheet shape at a temperature of 164° C. to obtain an extruded product. The extruded product was cooled in a water bath at 16° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 30° C. while a pressure of 0.05 MPa was applied to the base tape to remove a part of liquid paraffin from the inside of the base tape. Thereafter, the base tape was drawn in the longitudinal direction at a temperature of 115° C. to 5.8 times (longitudinal drawing) and successively drawn in the width direction at a temperature of 105° C. to 13 times (lateral drawing), and then immediately heat treatment (heat setting) was performed at 140° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 125° C. to obtain a substrate for a liquid filter, including a polyolefin microporous membrane, of the disclosure.

Example 5

A polyethylene composition obtained by mixing 4.6 parts by mass of a high-molecular-weight polyethylene having a Ca content of 140 ppb and a weight-average molecular weight of 5,100,000 (PE1) and 18.4 parts by mass of a low-molecular-weight polyethylene having a Ca content of 270 ppb and a weight-average molecular weight of 650,000 (PE2) was used. A pre-prepared mixed solvent of 74.5 parts by mass of liquid paraffin and 2.5 parts by mass of decalin (decahydronaphthalene) was mixed with the polyethylene composition such that the total polyethylene resin concentration is 23% by mass, thereby preparing a polyethylene solution.

The polyethylene solution was extruded from a die into a sheet shape at a temperature of 164° C. to obtain an extruded product. The extruded product was cooled in a water bath at 16° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 30° C. while a pressure of 0.05 MPa was applied to the base tape to remove a part of liquid paraffin from the inside of the base tape. Thereafter, the base tape was drawn in the longitudinal direction at a temperature of 115° C. to 5.8 times (longitudinal drawing) and successively drawn in the width direction at a temperature of 105° C. to 13 times (lateral drawing), and then immediately heat treatment (heat setting) was performed at 128° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane, of the disclosure.

Example 6

A polyethylene composition obtained by mixing 4.6 parts by mass of a high-molecular-weight polyethylene having a Ca content of 140 ppb and a weight-average molecular weight of 5,100,000 (PE1) and 18.4 parts by mass of a low-molecular-weight polyethylene having a Ca content of 270 ppb and a weight-average molecular weight of 650,000 (PE2) was used. A pre-prepared mixed solvent of 74.5 parts by mass of liquid paraffin and 2.5 parts by mass of decalin (decahydronaphthalene) was mixed with the polyethylene composition such that the total polyethylene resin concentration is 23% by mass, thereby preparing a polyethylene solution.

The polyethylene solution was extruded from a die into a sheet shape at a temperature of 164° C. to obtain an extruded product. The extruded product was cooled in a water bath at 16° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 30° C. while a pressure of 0.05 MPa was applied to the base tape to remove a part of liquid paraffin from the inside of the base tape. Thereafter, the base tape was drawn in the longitudinal direction at a temperature of 115° C. to 7 times (longitudinal drawing) and successively drawn in the width direction at a temperature of 105° C. to 11 times (lateral drawing), and then immediately heat treatment (heat setting) was performed at 125° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane, of the disclosure.

Example 7

A polyethylene composition obtained by mixing 10.0 parts by mass of a high-molecular-weight polyethylene having a Ca content of 140 ppb and a weight-average molecular weight of 5,100,000 (PE1) and 10.0 parts by mass of a low-molecular-weight polyethylene having a Ca content of 270 ppb and a weight-average molecular weight of 650,000 (PE2) was used. A pre-prepared mixed solvent of 77.3 parts by mass of liquid paraffin and 2.7 parts by mass of decalin (decahydronaphthalene) was mixed with the polyethylene composition such that the total polyethylene resin concentration is 20% by mass, thereby preparing a polyethylene solution.

The polyethylene solution was extruded from a die into a sheet shape at a temperature of 156° C. to obtain an extruded product. The extruded product was cooled in a water bath at 16° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 30° C. while a pressure of 0.05 MPa was applied to the base tape to remove a part of liquid paraffin from the inside of the base tape. Thereafter, the base tape was drawn in the longitudinal direction at a temperature of 115° C. to 7 times (longitudinal drawing) and successively drawn in the width direction at a temperature of 105° C. to 13 times (lateral drawing), and then immediately heat treatment (heat setting) was performed at 135° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane, of the disclosure.

Example 8

A polyethylene composition obtained by mixing 24 parts by mass of a high-molecular-weight polyethylene having a Ca content of 140 ppb and a weight-average molecular weight of 5,100,000 (PE1) and 6 parts by mass of a low-molecular-weight polyethylene having a Ca content of 270 ppb and a weight-average molecular weight of 650,000 (PE2) was used. A pre-prepared mixed solvent of 67.7 parts by mass of liquid paraffin and 2.3 parts by mass of decalin (decahydronaphthalene) was mixed with the polyethylene composition such that the total polyethylene resin concentration is 30% by mass, thereby preparing a polyethylene solution.

The polyethylene solution was extruded from a die into a sheet shape at a temperature of 158° C. to obtain an extruded product. The extruded product was cooled in a water bath at 16° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 30° C. while a pressure of 0.05 MPa was applied to the base tape to remove a part of liquid paraffin from the inside of the base tape. Thereafter, the base tape was drawn in the longitudinal direction at a temperature of 115° C. to 7 times (longitudinal drawing) and successively drawn in the width direction at a temperature of 105° C. to 9 times (lateral drawing), and then immediately heat treatment (heat setting) was performed at 130° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 105° C. to obtain a substrate for a liquid filter, including a polyolefin microporous membrane, of the disclosure.

Comparative Example 1

A polyethylene composition obtained by mixing 6 parts by mass of a high-molecular-weight polyethylene having a Ca content of 41,000 ppb and a weight-average molecular weight of 4,600,000 (PE1) and 24 parts by mass of a low-molecular-weight polyethylene having a Ca content of 34,000 ppb and a weight-average molecular weight of 560,000 (PE2) was used. A pre-prepared mixed solvent of 67.5 parts by mass of liquid paraffin and 2.5 parts by mass of decalin (decahydronaphthalene) was mixed with the polyethylene composition such that the total polyethylene resin concentration is 30% by mass, thereby preparing a polyethylene solution.

The polyethylene solution was extruded from a die into a sheet shape at a temperature of 158° C. Then, the extruded product was cooled in a water bath at 18° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 10 minutes, and then at 95° C. for 10 minutes to remove decalin from the inside of the base tape. Subsequently, the base tape was conveyed on a roller heated to 90° C. while a pressure of 0.25 MPa was applied to the base tape to remove a part of liquid paraffin from the inside of the base tape. Thereafter, the base tape was drawn in the longitudinal direction at a temperature of 95° C. to 5.8 times (longitudinal drawing) and successively drawn in the width direction at a temperature of 105° C. to 13 times (lateral drawing), and then immediately heat treatment (heat setting) was performed at 120° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane.

Comparative Example 2

A polyethylene composition obtained by mixing 6 parts by mass of a high-molecular-weight polyethylene having a Ca content of 140 ppb and a weight-average molecular weight of 5,100,000 (PE1) and 24 parts by mass of a low-molecular-weight polyethylene having a Ca content of 270 ppb and a weight-average molecular weight of 650,000 (PE2) was used. A pre-prepared mixed solvent of 69 parts by mass of liquid paraffin and 3 parts by mass of decalin (decahydronaphthalene) was mixed with the polyethylene composition such that the total polyethylene resin concentration is 28% by mass, thereby preparing a polyethylene solution.

The polyethylene solution was extruded from a die into a sheet shape at a temperature of 160° C. to obtain an extruded product. The extruded product was cooled in a water bath at 25° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 55° C. for 10 minutes, and then at 95° C. for 10 minutes to remove decalin from the inside of the base tape. Subsequently, the base tape was conveyed on a roller heated to 40° C. while a pressure of 0.40 MPa was applied to the base tape to remove a part of liquid paraffin from the inside of the base tape. Thereafter, the base tape was drawn in the longitudinal direction at a temperature of 90° C. to 6 times (longitudinal drawing) and successively drawn in the width direction at a temperature of 105° C. to 13 times (lateral drawing), and then immediately heat treatment (heat setting) was performed at 145° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 45° C., and the base tape was subject to annealing treatment while being conveyed on a roller heated to 105° C. to obtain a substrate for a liquid filter, including a polyolefin microporous membrane.

Comparative Example 3

A polyethylene composition obtained by mixing 18.4 parts by mass of a high-molecular-weight polyethylene having a Ca content of 140 ppb and a weight-average molecular weight of 5,100,000 (PE1) and 4.6 parts by mass of a low-molecular-weight polyethylene having a Ca content of 270 ppb and a weight-average molecular weight of 650,000 (PE2) was used. A pre-prepared mixed solvent of 74.5 parts by mass of liquid paraffin and 2.5 parts by mass of decalin (decahydronaphthalene) was mixed with the polyethylene composition such that the total polyethylene resin concentration is 23% by mass, thereby preparing a polyethylene solution.

The polyethylene solution was extruded from a die into a sheet shape at a temperature of 155° C. to obtain an extruded product. The extruded product was cooled in a water bath at 20° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape to remove a part of liquid paraffin from the inside of the base tape. Thereafter, the base tape was drawn in the longitudinal direction at a temperature of 105° C. to 7 times (longitudinal drawing) and successively drawn in the width direction at a temperature of 105° C. to 11 times (lateral drawing), and then immediately heat treatment (heat setting) was performed at 138° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane.

Comparative Example 4

A polyethylene composition obtained by mixing 12.5 parts by mass of a high-molecular-weight polyethylene having a Ca content of 140 ppb and a weight-average molecular weight of 5,100,000 (PE1) and 12.5 parts by mass of a low-molecular-weight polyethylene having a Ca content of 270 ppb and a weight-average molecular weight of 650,000 (PE2) was used. A pre-prepared mixed solvent of 72.5 parts by mass of liquid paraffin and 2.5 parts by mass of decalin (decahydronaphthalene) was mixed with the polyethylene composition such that the total polyethylene resin concentration is 25% by mass, thereby preparing a polyethylene solution.

The polyethylene solution was extruded from a die into a sheet shape at a temperature of 155° C. to obtain an extruded product. The extruded product was cooled in a water bath at 20° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape to remove a part of liquid paraffin from the inside of the base tape. Thereafter, the base tape was drawn in the longitudinal direction at a temperature of 115° C. to 3.5 times (longitudinal drawing) and successively drawn in the width direction at a temperature of 115° C. to 13 times (lateral drawing), and then immediately heat treatment (heat setting) was performed at 115° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane.

Comparative Example 5

A polyethylene composition obtained by mixing 11.5 parts by mass of a high-molecular-weight polyethylene having a Ca content of 140 ppb and a weight-average molecular weight of 5,100,000 (PE1) and 11.5 parts by mass of a low-molecular-weight polyethylene having a Ca content of 270 ppb and a weight-average molecular weight of 650,000 (PE2) was used. A pre-prepared mixed solvent of 74.4 parts by mass of liquid paraffin and 2.6 parts by mass of decalin (decahydronaphthalene) was mixed with the polyethylene composition such that the total polyethylene resin concentration is 23% by mass, thereby preparing a polyethylene solution.

The polyethylene solution was extruded from a die into a sheet shape at a temperature of 155° C. to obtain an extruded product. The extruded product was cooled in a water bath at 20° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape to remove a part of liquid paraffin from the inside of the base tape. Thereafter, the base tape was drawn in the longitudinal direction at a temperature of 115° C. to 7 times (longitudinal drawing) and successively drawn in the width direction at a temperature of 105° C. to 8 times (lateral drawing), and then immediately heat treatment (heat setting) was performed at 130° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane.

Comparative Example 6

A polyethylene composition obtained by mixing 14 parts by mass of a high-molecular-weight polyethylene having a Ca content of 140 ppb and a weight-average molecular weight of 5,100,000 (PE1) and 14 parts by mass of a low-molecular-weight polyethylene having a Ca content of 270 ppb and a weight-average molecular weight of 650,000 (PE2) was used. A pre-prepared mixed solvent of 69.6 parts by mass of liquid paraffin and 2.4 parts by mass of decalin (decahydronaphthalene) was mixed with the polyethylene composition such that the total polyethylene resin concentration is 28% by mass, thereby preparing a polyethylene solution.

The polyethylene solution was extruded from a die into a sheet shape at a temperature of 155° C. to obtain an extruded product. The extruded product was cooled in a water bath at 20° C., a water flow was provided on the surface layer of the water bath, and a gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape to remove a part of liquid paraffin from the inside of the base tape. Thereafter, the base tape was drawn in the longitudinal direction at a temperature of 115° C. to 5.8 times (longitudinal drawing) and successively drawn in the width direction at a temperature of 105° C. to 9 times (lateral drawing), and then immediately heat treatment (heat setting) was performed at 130° C.

Next, the drawn base tape was immersed in a two-tank methylene chloride bath successively for 30 seconds per tank, thereby extracting liquid paraffin. In a case in which the tank where immersion is started is defined as a first tank, and the tank where immersion is finished is defined as a second tank, the purity of the washing solvent in the second tank is higher than that in the first tank. Thereafter, methylene chloride was removed by drying at 40° C., and the base tape was subject to annealing treatment while being conveyed on a roller heated to 120° C. to obtain a substrate for a liquid filter, including a polyolefin microporous membrane.

1.25 to 7, the water permeation efficiency and the collection efficiency are high. In addition, it was found that, since the amount of dissolution of Ca is low, and the solvent-resistant

TABLE 1

| | PE Raw Material | | | | PE Composition Ratio (Mass Ratio) | | Resin Concentration % by Mass | Longitudinal Draw Ratio Times | Longitudinal Drawing Temperature ° C. | Lateral Drawing | | Heat Setting Temperature ° C. | Annealing Temperature ° C. |
|---|---|---|---|---|---|---|---|---|---|---|---|---|---|
| | PE1 | | PE2 | | | | | | | Ratio Times | Temperature ° C. | | |
| | MW | Amount of Ca (ppb) | MW | Amount of Ca (ppb) | PE1 | PE2 | | | | | | | |
| Example 1 | 5,100,000 | 140 | 650,000 | 270 | 8 | 2 | 23 | 5.8 | 115 | 13 | 105 | 130 | 120 |
| Example 2 | 5,100,000 | 140 | 650,000 | 270 | 8 | 2 | 23 | 5.8 | 95 | 13 | 105 | 140 | 120 |
| Example 3 | 5,100,000 | 140 | 650,000 | 270 | 5 | 5 | 25 | 5.8 | 115 | 13 | 105 | 115 | 120 |
| Example 4 | 5,100,000 | 140 | 650,000 | 270 | 2 | 8 | 30 | 5.8 | 115 | 13 | 105 | 140 | 125 |
| Example 5 | 5,100,000 | 140 | 650,000 | 270 | 2 | 8 | 23 | 5.8 | 115 | 13 | 105 | 128 | 120 |
| Example 6 | 5,100,000 | 140 | 650,000 | 270 | 2 | 8 | 23 | 7 | 115 | 11 | 105 | 125 | 120 |
| Example 7 | 5,100,000 | 140 | 650,000 | 270 | 5 | 5 | 20 | 7 | 115 | 13 | 105 | 135 | 120 |
| Example 8 | 5,100,000 | 140 | 650,000 | 270 | 8 | 2 | 30 | 7 | 115 | 9 | 105 | 130 | 105 |
| Comparative Example 1 | 4,600,000 | 41,000 | 560,000 | 34,000 | 2 | 8 | 30 | 5.8 | 95 | 13 | 105 | 120 | 120 |
| Comparative Example 2 | 5,100,000 | 140 | 650,000 | 270 | 2 | 8 | 28 | 6 | 90 | 13 | 105 | 145 | 105 |
| Comparative Example 3 | 5,100,000 | 140 | 650,000 | 270 | 8 | 2 | 23 | 7 | 105 | 11 | 105 | 138 | 120 |
| Comparative Example 4 | 5,100,000 | 140 | 650,000 | 270 | 5 | 5 | 25 | 3.5 | 115 | 13 | 115 | 115 | 120 |
| Comparative Example 5 | 5,100,000 | 140 | 650,000 | 270 | 5 | 5 | 23 | 7 | 115 | 8 | 105 | 130 | 120 |
| Comparative Example 6 | 5,100,000 | 140 | 650,000 | 270 | 5 | 5 | 28 | 5.8 | 115 | 9 | 105 | 130 | 120 |

TABLE 2

| | Mean Flow Pore Size nm | Thickness μm | Porosity % | Amount of Ca ppb | MD Tensile Elongation % | TD Tensile Elongation % | MD/TD Tensile Elongation Ratio | 80° C. Shrinkage Ratio % | Water Permeation Efficiency mL/min/cm² | 5% HCl Solution Amount of Dissolution of Ca ppb | Solvent-Resistant Dimensional Stability | Collection Efficiency |
|---|---|---|---|---|---|---|---|---|---|---|---|---|
| Example 1 | 30 | 10 | 50 | 350 | 94 | 55 | 1.71 | 12 | 0.25 | 13 | A | A |
| Example 2 | 40 | 20 | 50 | 320 | 60 | 26 | 2.31 | 15 | 0.38 | 11 | A | B |
| Example 3 | 15 | 5 | 42 | 140 | 82 | 65 | 1.27 | 8 | 0.10 | 10 | B | A |
| Example 4 | 50 | 25 | 60 | 790 | 144 | 45 | 3.20 | 19 | 1.50 | 45 | A | B |
| Example 5 | 30 | 5 | 50 | 100 | 117 | 65 | 1.80 | 17 | 0.40 | 12 | B | B |
| Example 6 | 20 | 11 | 54 | 90 | 59 | 90 | 0.65 | 15 | 0.36 | 11 | B | A |
| Example 7 | 50 | 30 | 65 | 320 | 63 | 66 | 0.95 | 19 | 1.70 | 42 | A | B |
| Example 8 | 15 | 7 | 48 | 120 | 42 | 90 | 0.47 | 11 | 0.10 | 9 | A | A |
| Comparative Example 1 | 25 | 10 | 50 | 40,000 | 133 | 70 | 1.90 | 20 | 0.10 | 150 | C | A |
| Comparative Example 2 | 55 | 20 | 71 | 650 | 78 | 58 | 1.34 | 26 | 2.10 | 44 | C | C |
| Comparative Example 3 | 40 | 10 | 71 | 330 | 79 | 72 | 1.10 | 22 | 0.50 | 33 | D | C |
| Comparative Example 4 | 25 | 9 | 50 | 490 | 230 | 25 | 9.20 | 21 | 0.10 | 21 | D | A |
| Comparative Example 5 | 30 | 11 | 60 | 440 | 35 | 88 | 0.40 | 24 | 0.20 | 22 | D | C |
| Comparative Example 6 | 20 | 11 | 51 | 560 | 71 | 69 | 1.03 | 20 | 0.08 | 31 | C | B |

As shown in Tables 1 and 2, in Examples 1 to 5, it was found that, since the mean flow pore size is from 1 nm to 50 nm, the calcium content in the polyolefin microporous membrane is 2,000 ppb or less, and the ratio of the tensile elongation in the longitudinal direction (MD) to the tensile elongation in the width direction (TD) perpendicular to the longitudinal direction (MD/TD tensile elongation ratio) of the polyolefin microporous membrane is from more than dimensional stability is excellent, the production efficiency of a filter cartridge can be improved.

In addition, in Examples 6 to 8, it was found that, since the mean flow pore size is from 1 nm to 50 nm, the calcium content in the polyolefin microporous membrane is 2,000 ppb or less, and the ratio of the tensile elongation in the longitudinal direction (MD) to the tensile elongation in the width direction (TD) perpendicular to the longitudinal direction (MD/TD tensile elongation ratio) of the polyolefin microporous membrane is from 0.47 to less than 0.96, the water permeation efficiency and the collection efficiency are excellent. In addition, it was found that, since the amount of dissolution of Ca is low, and the solvent-resistant dimensional stability is excellent, the production efficiency of a filter cartridge can be improved.

On the other hand, in Comparative Example 1, the calcium content in the polyolefin microporous membrane is high, 40,000 ppb, and thus the amount of dissolution of Ca is high, and the solvent-resistant dimensional stability is also inferior. Therefore, the production efficiency of a filter cartridge is inferior.

In Comparative Example 2, the mean flow pore size is large, 55 nm, and thus the water permeation efficiency and the collection efficiency are low. In addition, the solvent-resistant dimensional stability is inferior. Therefore, the production efficiency of a filter cartridge is inferior.

In Comparative Examples 3 to 6, the MD/TD tensile elongation ratio is neither from more than 1.25 to 7 nor from 0.47 to less than 0.96. Therefore, the solvent-resistant dimensional stability is inferior, and the production efficiency of a filter cartridge is inferior.

The disclosure of Japanese Patent Application No. 2018-139729 filed on Jul. 25, 2018 is incorporated herein by reference in its entirety. All documents, patent applications, and technical standards described in the present description are incorporated herein by reference to the same extent as if each individual document, patent application, and technical standard were specifically and individually indicated to be incorporated by reference.

The invention claimed is:

1. A substrate for a liquid filter, comprising: a polyolefin microporous membrane, wherein:
   a mean flow pore size in a pore size distribution of the polyolefin microporous membrane, measured by a half dry method according to gas-liquid phase substitution, is from 1 nm to 50 nm,
   a calcium content in the polyolefin microporous membrane is 2,000 ppb or less,
   a ratio of a tensile elongation in a longitudinal direction (MD), to a tensile elongation in a width direction (TD) perpendicular to the longitudinal direction (MD/TD tensile elongation ratio), of the polyolefin microporous membrane is from 0.47 to less than 0.96 or from more than 1.25 to 7,
   a polyolefin configuring the polyolefin microporous membrane is a polyethylene composition containing a high-molecular-weight polyethylene having a weight-average molecular weight of from 5,100,000 to 6,000,000 and a low-molecular-weight polyethylene having a weight-average molecular weight of from 650,000 to 800,000, and
   a blending ratio of the high-molecular-weight polyethylene and the low-molecular-weight polyethylene is from 50:50 to 80:20 by mass ratio.

2. The substrate for a liquid filter according to claim 1, wherein the tensile elongation in the width direction (TD) of the polyolefin microporous membrane is from 20% to 120%.

3. The substrate for a liquid filter according to claim 2, wherein the tensile elongation in the width direction (TD) of the polyolefin microporous membrane is from 20% to less than 90%.

4. The substrate for a liquid filter according to claim 1, wherein a shrinkage ratio in the longitudinal direction (MD) of the polyolefin microporous membrane after being left for 10 minutes at 80° C. is less than 20%.

5. The substrate for a liquid filter according to claim 1, wherein a porosity of the polyolefin microporous membrane is from 35% to 70%.

6. The substrate for a liquid filter according to claim 5, wherein the porosity of the polyolefin microporous membrane is from 41% to 70%.

7. The substrate for a liquid filter according to claim 1, wherein a water permeation efficiency of the polyolefin microporous membrane, under a reduced pressure of 90 kPa, in terms of 10 μm thickness is from 0.10 mL/min/cm$^2$ to 2.00 mL/min/cm$^2$.

8. The substrate for a liquid filter according to claim 1, wherein a thickness of the polyolefin microporous membrane is from 1 μm to 50 μm.

9. The substrate for a liquid filter according to claim 1, wherein the MD/TD tensile elongation ratio of the polyolefin microporous membrane is from 0.47 to 0.65.

* * * * *